(12) United States Patent
Pentkovksi et al.

(10) Patent No.: US 7,484,045 B2
(45) Date of Patent: Jan. 27, 2009

(54) STORE PERFORMANCE IN STRONGLY-ORDERED MICROPROCESSOR ARCHITECTURE

(75) Inventors: Vladimir Pentkovksi, Folsom, CA (US); Ling Cen, Austin, TX (US); Vivek Garg, Folsom, CA (US); Deep Buch, Folsom, CA (US); David Zhao, Pinole, CA (US)

(73) Assignee: Intel Corporation, Santa Clara, CA (US)

( * ) Notice: Subject to any disclaimer, the term of this patent is extended or adjusted under 35 U.S.C. 154(b) by 75 days.

(21) Appl. No.: 10/813,942

(22) Filed: Mar. 30, 2004

(65) Prior Publication Data

US 2005/0223177 A1 Oct. 6, 2005

(51) Int. Cl.
G06F 12/08 (2006.01)

(52) U.S. Cl. ........................................ 711/145; 711/152

(58) Field of Classification Search .................. 711/121, 711/124, 126, 133, 141, 143, 146, 144, 145, 711/118, 147; 712/241; 710/201, 56
See application file for complete search history.

(56) References Cited

U.S. PATENT DOCUMENTS

| | | | | |
|---|---|---|---|---|
| 5,043,886 A | * | 8/1991 | Witek et al. ................. | 711/143 |
| 5,119,485 A | * | 6/1992 | Ledbetter et al. ............ | 711/146 |
| 5,202,969 A | * | 4/1993 | Sato et al. .................... | 711/143 |
| 5,210,848 A | * | 5/1993 | Liu .............................. | 711/124 |
| 5,226,144 A | * | 7/1993 | Moriwaki et al. ............ | 711/121 |
| 5,255,387 A | * | 10/1993 | Arnold et al. ................ | 707/201 |
| 5,335,335 A | * | 8/1994 | Jackson et al. .............. | 711/121 |
| 5,526,510 A | * | 6/1996 | Akkary et al. ............... | 711/133 |
| 5,671,444 A | * | 9/1997 | Akkary et al. ................ | 710/52 |
| 5,680,572 A | * | 10/1997 | Akkary et al. .............. | 711/126 |
| 5,748,938 A | * | 5/1998 | Kahle .......................... | 711/138 |
| 5,867,400 A | * | 2/1999 | El-Ghoroury et al. .......... | 716/1 |
| 5,920,714 A | * | 7/1999 | Schiffleger ................... | 712/241 |
| 6,009,488 A | | 12/1999 | Kavipurapu | |
| 6,374,332 B1 | | 4/2002 | Mackenthun et al. | |

OTHER PUBLICATIONS

"Office Action dated Mar. 31, 2008" for Korean Patent Application No. 10-2005-26670, 7 pages.

* cited by examiner

Primary Examiner—Pierre-Michel Bataille
(74) Attorney, Agent, or Firm—Caven & Aghevli LLC

(57) ABSTRACT

A store operation architecture in which store operation latency and read-for-ownership (RFO) throughput are improved. Embodiments of the invention relate to a method and apparatus to improve store performance in a microprocessor by allowing out-of-order issuance of RFO operations and more efficiently using the store buffer latency periods.

24 Claims, 6 Drawing Sheets

STORE PERFORMANCE IN STRONGLY-ORDERED MICROPROCESSOR ARCHITECTURE

FIELD

Embodiments of the invention relate to microprocessor architecture. More particularly, embodiments of the invention relate to a method and apparatus to improve store performance in a microprocessor by allowing out-of-order issuance of read-for-ownership operations and more efficiently using the store buffer latency periods.

BACKGROUND

A microprocessor typically communicates with a computer system via a shared computer system bus known as a "front-side bus" (FSB). However, as microprocessor performance is improved and as computer systems use multiple processors interconnected along the same FSB, the FSB has become a performance bottleneck.

One approach to this problem is the use of point-to-point (PtP) links between the various processors in a multiple processor system. PtP links are typically implemented as dedicated bus traces for each processor within the multi-processor network. Although typical PtP links provide more throughput than FSB, the latency of PtP links can be worse than the latency of FSB.

Latency of PtP can particularly impact the performance of store operations performed by microprocessor, especially in microprocessor architectures requiring strong ordering among the store operations. Because of the strong ordering requirements, for example, previously issued store operations must typically be accessible, or at least detectable, to other bus agents within the system before later store operations may be issued by the processor. The detectability of an operation, such as a store, load, or other operation, to other bus agents within a computer system is often referred to as "global observation" of the operation. Typically, microprocessor operations or instructions only become globally observable after they have been stored to a cache or other memory in which other agents in the system may detect the presence of the operation or instruction.

In the case of store operations within a strong ordering microprocessor architecture, typical microprocessors will not issue a store operation from a store buffer, or other store queuing structure, or, in some cases, from the processor execution unit, until the previous store operation has been globally observed. The issuance of a store operation in typical microprocessor architectures is preceded by an operation, such as read-for-ownership (RFO) operation, to gain exclusive control of a line of the cache or other storage area in which the store operation is to be stored so that it may be globally observed. However, in typical microprocessor architectures, RFO operations are not issued until preceding store operations are globally observed.

FIG. 1 illustrates a prior art cache architecture for handling issued store operations within a strongly ordered microprocessor architecture. The store buffer contains data $X_1$ and $Y_1$ that are to be stored in addresses X and Y, respectively of the level-1 (L1) cache via the cache line fill buffer (LFB). However, in typical prior art architectures, neither the store data, $X_1$ and $Y_1$, nor their corresponding RFO operations may be issued until the data $X_0$ and address X in the L1 cache has been globally observed.

Due to latency in the issuance, and ultimately the retiring, of store operations within prior art architectures, the overall performance of a microprocessor and the system in which it exists may be compromised. Furthermore, as PtP multiple processor systems become more pervasive, the problem may be exacerbated as each processor in the system may dependent upon data being stored by other processors within the system.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention relate to microprocessor architecture. More particularly, embodiments of the invention relate to a method and apparatus to improve store performance in a microprocessor by allowing out-of-order issuance of read-for-ownership (RFO) operations and more efficiently using the store buffer latency periods.

In order to facilitate out-of-order RFO operations while improving store buffer efficiency, at least one embodiment of the invention involves using a storage medium, such as a globally observable store buffer (GoSB), to keep track of store data that has become globally observable. Tracking globally observed data within the GoSB allows store data to be stored within snoop'able storage devices, such as a level-1 (L1) cache and a line-fill buffer (LFB), without regard as to whether prior store data has been globally observed, thereby increasing the throughput of store data and the performance of store operations within the microprocessor.

Figure 1:
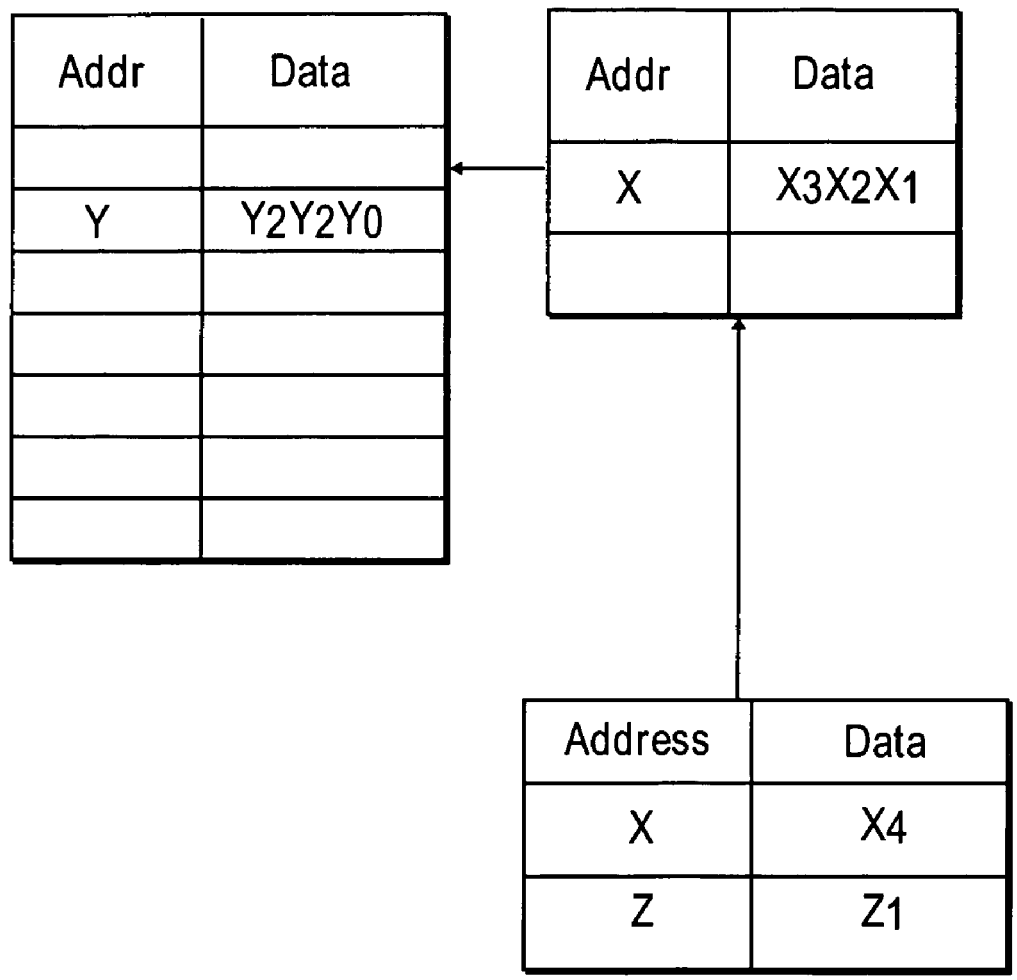
FIG. 1 illustrates a prior art cache architecture for handling issued store operations within a strongly ordered microprocessor architecture.
Figure 2:
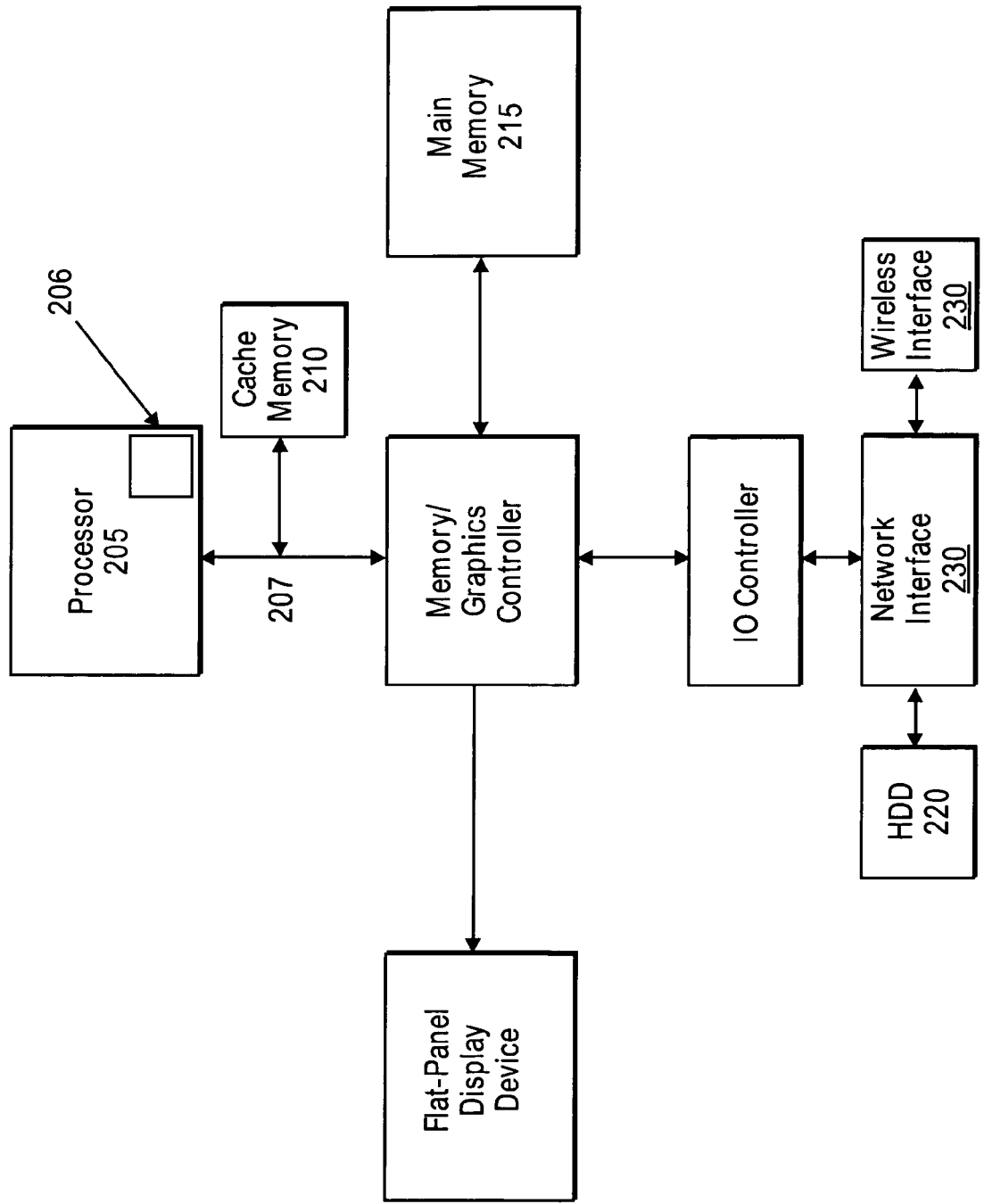
FIG. 2 illustrates a computer system in which at least one embodiment of the invention may be used.

FIG. 2 illustrates a computer system that may be used in conjunction with at least one embodiment of the invention. A processor 205 accesses data from a cache memory 210 and main memory 215. Illustrated within the processor of FIG. 2 is the location of one embodiment of the invention 206. However, embodiments of the invention may be implemented within other devices within the system, as a separate bus agent, or distributed throughout the system. The main memory may be dynamic random-access memory (DRAM), a hard disk drive (HDD) 220, or a memory source located remotely from the computer system containing various storage devices and technologies. The cache memory may be located either within the processor or in close proximity to the processor, such as on the processor's local bus 207. Furthermore, the cache memory may be composed of relatively fast memory cells, such as six-transistor (6T) cells, or other memory cells of approximately equal or faster access speed.

Figure 3:
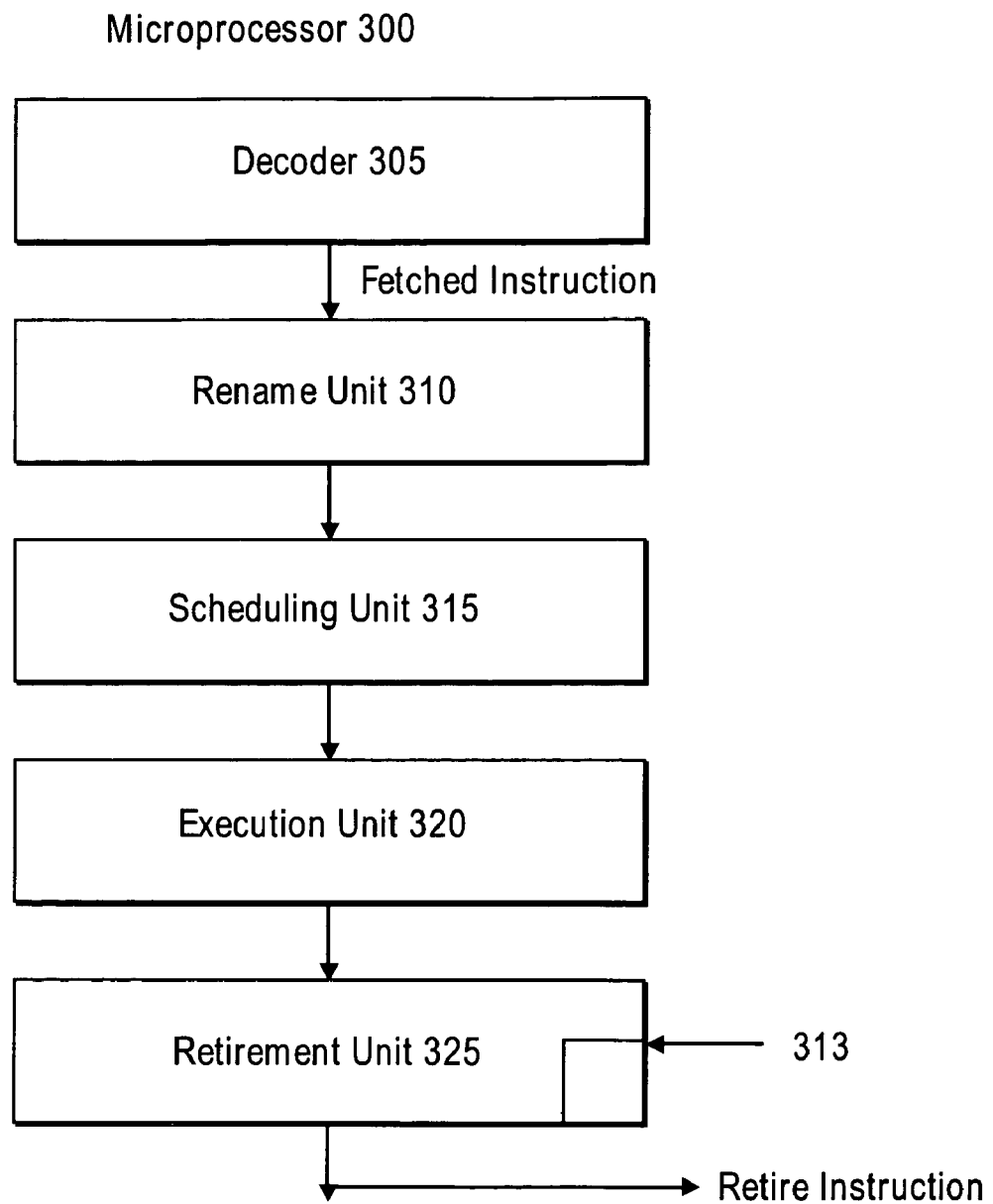
FIG. 3 illustrates a bus agent in which at least one embodiment of the invention may be used.

FIG. 3 illustrates a bus agent in which at least one embodiment of the invention may be used. Particularly, FIG. 3 illustrates a microprocessor 300 that contains one or more portions of at least one embodiment of the invention 305. Further illustrated within the microprocessor of FIG. 3 is an execution unit 320 to perform operations, such as store operations, within the microprocessor. The exact or relative location of the execution unit and portions of embodiments of the invention are not intended to be limited to those illustrated within FIG. 3.

Figure 4:
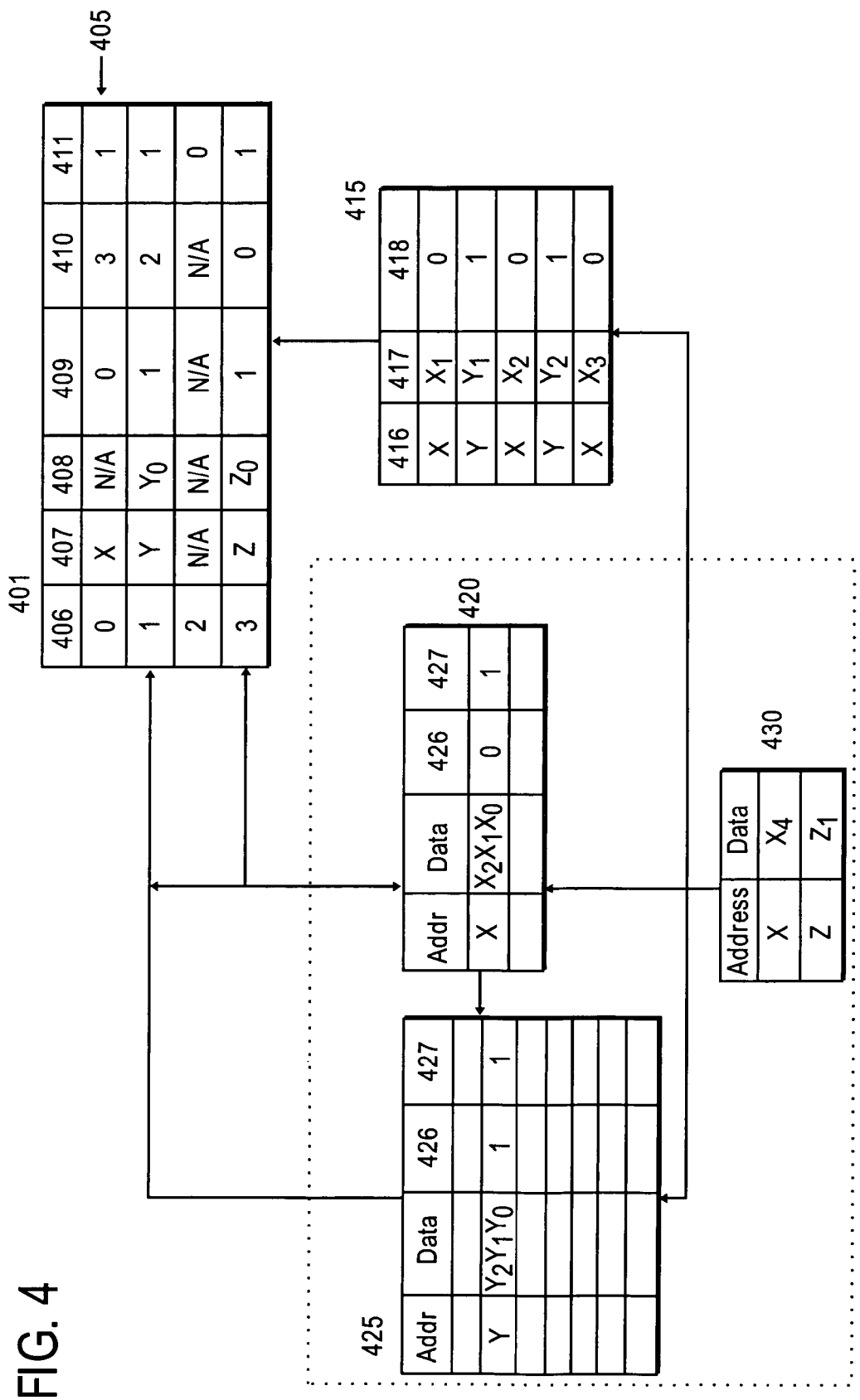
FIG. 4 illustrates one embodiment of the invention in which a global observation store buffer (GoSB) is used to track store operations and store corresponding data values that have become globally observable.

FIG. 4 illustrates one embodiment of the invention in which a GoSB 401 is used to track store operations and store corresponding data values that have become globally observable. Each entry 405 of the GOSB in FIG. 2 contains an index value field 406 with which the entry can be referenced, an address value field 407 to indicate target address of the store operation, a data value field 408 to store the data associated with the store operation, a counter field 409 to count a number of store operations that have yet to become globally observable and a valid bit field 410 to indicate whether the data corresponding to the globally observable store operation is available and stored in the data field of the GoSB.

Also illustrated in the FIG. 4 is a non-committed store queue (NcSQ) 415. The NcSQ stores data and address information corresponding to store operations that have been stored in either the line-fill buffer (LFB) 420 or the level-1 (L1) cache 425, but have yet become globally observable. In the embodiment illustrated in FIG. 4, the NcSQ is a first-in-first-out (FIFO) queue that has entries containing an address field 416 to store address information corresponding to a particular store operation, a data field 417 to store data corresponding to the store operation, and a GoSB index field 418 to store index information to reference the corresponding entry within the GoSB.

In the embodiment illustrated in FIG. 4, store operations are issued, transferred, or read from the store buffer 430 and stored within NcSQ and either the L1 cache or the LFB and a corresponding entry is allocated within the GoSB. After the store data becomes globally observable, the data is stored into the corresponding GoSB entry from NcSQ.

As store data corresponding to a particular target address are stored in the NcSQ, the corresponding counter field in the GoSB is incremented. As store operations become globally observable, the corresponding store address and data are removed from the NcSQ and the corresponding counter field within the GoSB is decremented. After a GoSB counter field reaches zero, the corresponding GoSB entry can be de-allocated and reallocated to a new store operation.

In the embodiment of the invention illustrated in FIG. 4, the L1 cache and LFB may each be snooped by one or more bus agents, such as a microprocessor, for a store data. Within each entry of the L1 cache and the LFB is a GoSB index field 426 and a GoSB valid field 427. The GoSB index field indicates to a snooping agent the location of the corresponding store data within the GoSB. The GoSB valid field indicates whether the corresponding GoSB index is valid and whether it has yet to be globally observable. The GoSB may also be snooped by a bus agent for the data and will provide the data or, alternatively, point to the most valid data to be used by the snooping agent. If both the L1 cache or the LFB and the GoSB contain the requested data, the GoSB provides the data to the requesting agent.

Figure 5:
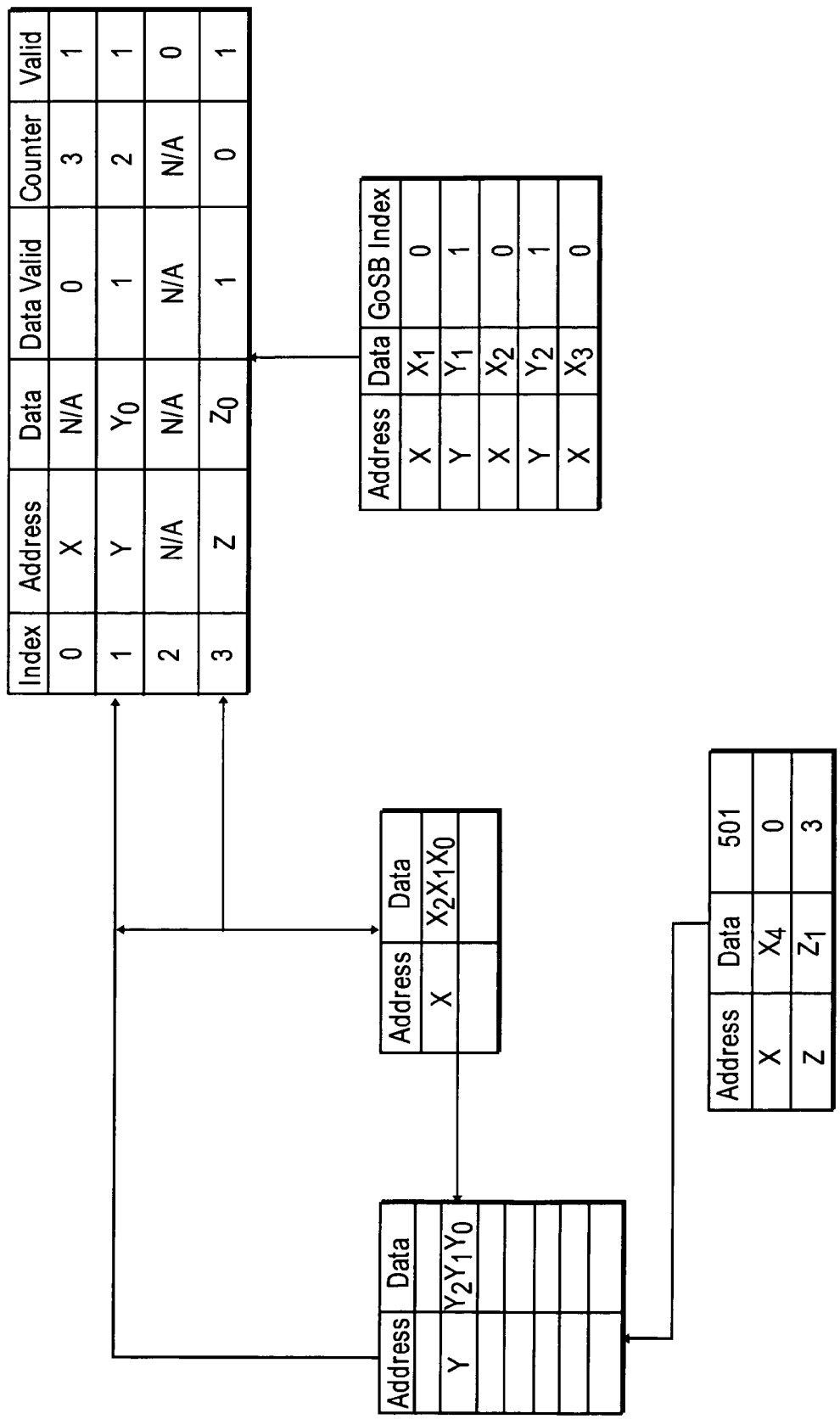
FIG. 5 illustrates an embodiment of the invention in which the GoSB index and GoSB valid fields are not stored within level-1 (L1) cache or line-fill buffer (LFB) entries, but instead, the GoSB index field is stored within entries of the store buffer.

FIG. 5 illustrates an embodiment of the invention in which the GoSB index and GoSB valid fields are not stored within the L1 cache or LFB entries, but instead, the GoSB index 501 field is stored within entries of the store buffer. In the embodiment illustrated in FIG. 5, a GoSB entry may be allocated for a store operation as soon as the store operation becomes non-speculative, or "senior", rather than waiting until the store operation is, read, transferred, or issued from the store buffer to the LFB or L1 cache.

Alternatively, the GoSB index field 501 may be logically associated with the store buffer and not physically within the same structure as the store buffer by using logic to point to a particular GoSB index field when a corresponding store buffer field is accessed. In either case, the GoSB index field associated with each entry of the store buffer allows snooping agents to locate the store data within the GoSB early so that the snooping agent may retrieve the data as soon as it becomes globally observable within the GoSB. In the embodiment illustrated in FIG. 5, read-for-ownership (RFO) operations may be issued before the corresponding store data is stored within the store buffer. Other aspects of the embodiment illustrated in FIG. 5 are similar to those already discussed with regard to the embodiment of the invention illustrated in FIG. 4.

Figure 6:
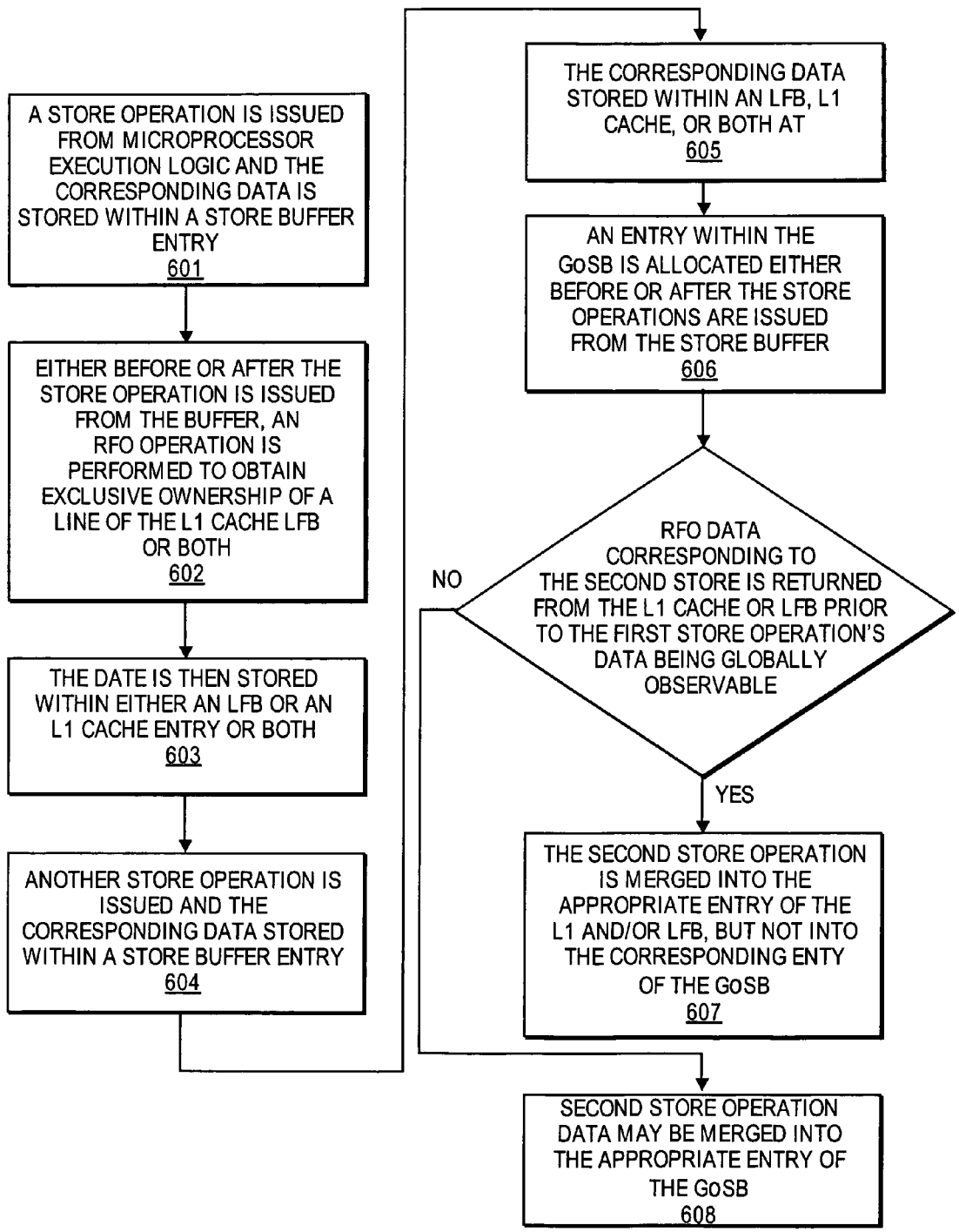
FIG. 6 is a flow chart illustrating operations associated with at least one embodiment of the invention.

FIG. 6 is a flow chart illustrating operations associated with at least one embodiment of the invention. Referring to FIG. 6, a first store operation is issued from microprocessor execution logic and the corresponding data is stored within a store buffer entry at operation 601. Either before or after the first store operation is issued from the store buffer, a GoSB entry is allocated and a RFO operation is performed to obtain exclusive ownership of a line in the GoSB and either the L1 cache or the LFB at operation 602. The first store operation data is then stored within the NcSQ and either an LFB or an L1 cache entry. The corresponding GoSB's counter is incremented at operation 603.

A second store operation is issued and the corresponding data stored within a store buffer entry at operation 604. Either before or after the second store operation is issued from the store buffer, a GOSB entry is allocated and an RFO operation is performed to obtain exclusive ownership of a line in GoSB and either the L1 cache or LFB at operation 605. The second store operation is then moved to NcSQ and either LFB or L1 cache, and the corresponding GoSB's counter is incremented at operation 606.

In at least one embodiment of the invention, the first and second store operation data resides within the LFB and L1 cache within the same period of time. If the RFO data corresponding to the second store is returned from the L1 cache or LFB prior to the first store operation's data being globally observable, the second store operation is merged into the appropriate entry of the L1 and/or LFB, but not into the corresponding entry of the GoSB, at operation 607. However, if the first store operation's data is globally observable before the second store operation's RFO data is returned from the L1 cache or LFB, the second store operation data may be merged into the appropriate entry of the GoSB at operation 608. A counter is either incremented or decremented to indicate the number of data associated with a particular store operation allocated within the GoSB that have not, or have, become globally observable, respectively.

Any or all portions of the embodiments of the invention illustrated herein may be implemented in a number of ways, including, but not limited to, logic using complimentary metal-oxide-semiconductor (CMOS) circuit devices (hardware), instructions stored within a storage medium (software), which when executed by a machine, such as a microprocessor, cause the microprocessor to perform operations described herein, or a combination of hardware and software.

Although the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. A processor having a strong ordering instruction architecture comprising:
    a store buffer from which a second data value is to be read and stored to a cache memory regardless of whether a first data value that is to be read from the store buffer prior to the second data value being read from the store buffer has been globally observable; and
    a global observation store buffer (GoSB) to store only the first and second data values after they have become globally observable, wherein the GoSB comprises an index field for each data value to be stored within the GoSB.

2. The processor of claim 1 further comprising a non-committed store queue (NcSQ) to store data that is stored in the cache memory but has yet to be globally observable.

3. The processor of claim 2 wherein the GoSB comprises a count value corresponding to a number of data stored within the NcSQ.

4. The processor of claim 2 wherein the NcSQ comprises an index field to store an index value indicating a location within the GoSB in which a corresponding data value is to be stored after it has become globally observable.

5. The processor of claim 4 wherein the cache memory comprises a line fill buffer (LFB) to store data to be written to a level-1(L1) cache.

6. The processor of claim 5 wherein the GoSB is to provide a data value to a snooping agent before either the L1 cache or the LSB is to provide the data value to the snooping agent.

7. The processor of claim 4 wherein the data is to be removed from the NcSQ after it has been globally observable.

8. The processor of claim 1 wherein the GoSB comprises an address field corresponding to a location a data value to be stored in the GoSB is to be written.

9. A computer system comprising:
    a memory unit to store a first instruction to store a first data value in at least one bus agent and a second instruction to store a second data value in at least one bus agent after the first data value has been stored in at least one bus agent;
    a logic to issue the second instruction before the first data has become globally observable;
    a level-1(L1) cache and a line fill buffer (LFB) to store the first and second data values concurrently prior to either of them being detectable by at least one bus agent;
    a first bus agent to detect either or both of the first and second data values prior to either or both of the first and second data values being detectable within the L1 cache or the LFB by the first bus agent; and
    a storage structure to store the first and second data values after they have become detectable by at least one bus agent, wherein the storage structure comprises an index field for each data value to be stored within the storage structure.

10. The computer system of claim 9 wherein the fir bus agent is to snoop either or both of the L1 cache and the LSB for either or both of the first and second data values.

11. The computer system of claim 10 wherein either or both of the L1 cache and the LFB are coupled to the first bus agent via a point-to-point bus.

12. The computer system of claim 9 wherein the first bus agent comprises an apparatus chosen from a list consisting of a microprocessor, a DRAM, a storage device, and a bus arbitration device.

13. An apparatus comprising:
    allocation logic to allocate an entry within a global observation store buffer (GoSB) to store globally observable data after a store operation to which the data corresponds becomes non-speculative and before the data is read from a store buffer;
    a cache memory coupled to the GoSB to store the data prior to the data becoming globally observable;
    read-for-ownership (RFO) logic to obtain exclusive ownership of a line within the cache prior to storing the data within the cache memory, wherein the GoSB comprises an index field for each data value to be stored within the GoSB.

14. The apparatus of claim 13 wherein the RFO logic is to obtain exclusive ownership of the line within the cache memory prior to the GoSB entry being allocated.

15. The apparatus of claim 14 wherein the store buffer comprises an index to indicate the location of the allocated entry within the GoSB.

16. The apparatus of claim 15 wherein the allocated entry within the GoSB is to be reallocated if the data becomes globally observable.

17. A method for issuing strong ordered memory operations comprising:
    issuing a first store operation;
    storing a first data associated with the first store operation within a store buffer;
    issuing a second store operation;
    storing a second data associated with the second store operation within the store buffer;
    storing the first data within a storage unit;
    storing the second data within the storage unit during a period of time in which the first data is stored within the storage unit and is not globally observable, wherein the storage unit comprises an index field for each data value to be stored within the storage unit.

18. The method of claim 17 further comprising issuing a read-for-ownership (RFO) operation to obtain exclusive control over a line within the storage unit prior to one of the first or second data being stored within the storage unit.

19. The method of claim 18 further comprising allocating an entry within a global observation Store buffer (GoSB) after either the first or second data becomes globally observable.

20. The method of claim 19 further comprising updating a counter to reflect a number of data values corresponding to a store address location that are stored within the storage unit but are not globally observable.

21. The method of claim 20 wherein the entry is reallocated to store other data after the counter equals zero.

22. The method of claim 21 further comprising updating a non-committed store queue (NcSQ) to indicate to the number of data values.

23. The method of claim 22 wherein the storage unit is a level-1(L1) cache.

24. The method of claim 22 wherein the storage unit is a line-fill buffer.

* * * * *